F. B. KOLLBERG & M. KRAUT.

FLOTATION MACHINE.

APPLICATION FILED JULY 1, 1916.

Reissued Sept. 17, 1918.

14,522.

2 SHEETS—SHEET 1.

Inventors.
Frederick B. Kollberg.
Max Kraut.

by. Edmund A. Strauss Atty.

F. B. KOLLBERG & M. KRAUT.

FLOTATION MACHINE.

APPLICATION FILED JULY 1, 1916.

Reissued Sept. 17, 1918.

14,522.

2 SHEETS—SHEET 2.

Inventors.
Frederick B. Kollberg.
Max Kraut.
by
Edmund A. Strauss.
Atty.

UNITED STATES PATENT OFFICE.

FREDERICK B. KOLLBERG, OF BISBEE, ARIZONA, AND MAX KRAUT, OF LOS ANGELES, CALIFORNIA, ASSIGNORS TO SOUTHWESTERN ENGINEERING COMPANY, A CORPORATION OF CALIFORNIA.

FLOTATION-MACHINE.

14,522. Specification of Reissued Letters Patent. Reissued Sept. 17, 1918.

Original No. 1,174,737, dated March 7, 1916, Serial No. 43,218, filed August 2, 1915. Application for reissue filed July 1, 1916. Serial No. 107,202.

*To all whom it may concern:*

Be it known that we, FREDERICK B. KOLLBERG, of the town of Bisbee, county of Cochise, State of Arizona, and MAX KRAUT, of the city of Los Angeles, county of Los Angeles, State of California, both citizens of the United States, have invented new and useful Improvements in Flotation-Machines, of which the following is a specification.

This application is a continuation in part of our application for flotation machines, S. N. 31,274, filed May 29, 1915, as to the subject matter of a single compartment aeration chamber, a frothing chamber, and aerating means in said aeration chamber, and means of communication therebetween, whereby the pulp passes in a helical path through the aeration chamber.

The objects of this invention are first, to provide a single compartment aeration chamber in which the pulp is successively retreated in its passage through the machine; second, to successively retreat the pulp by causing it to describe a substantially helical path through the aeration means and frothing chamber from the pulp inlet end of the machine to the tailings discharge end; and third, to control the passage of the pulp along said helical path to effectively demineralize the pulp depending upon its character.

We accomplish the above mentioned objects by means of the embodiment of our invention disclosed in the accompanying drawing.

Figure 1:
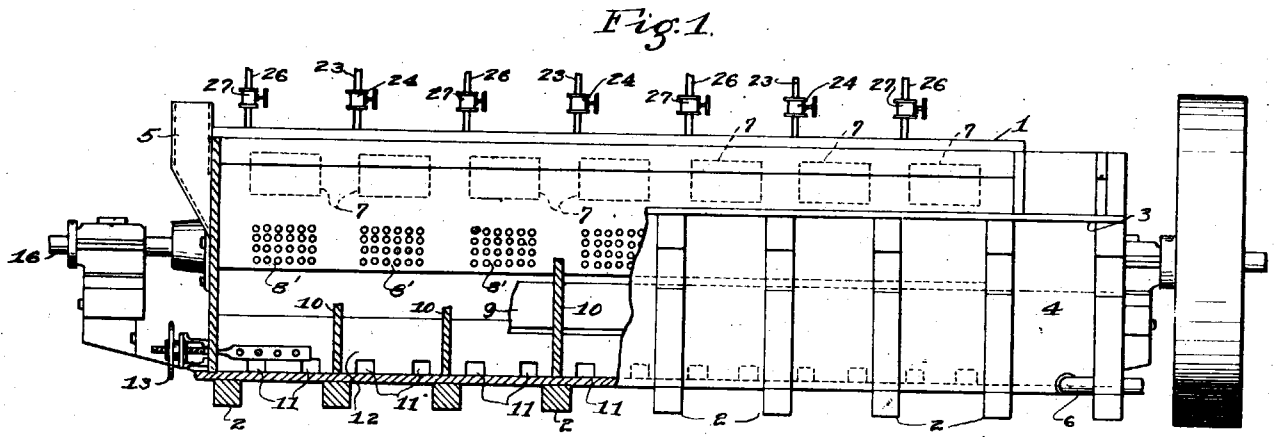
Figure 1 is a partial sectional front elevation of a flotation apparatus embodying the invention.
Figure 2:
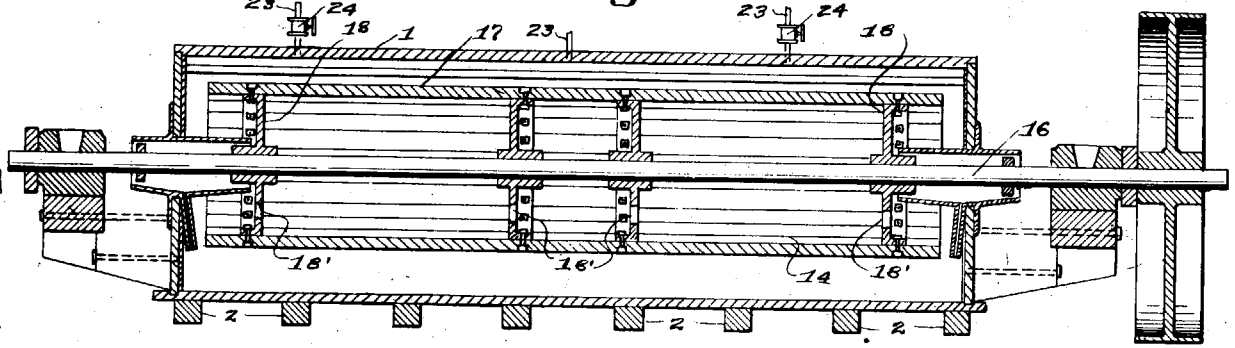
Fig. 2 is a vertical central longitudinal section through the aeration chamber of the apparatus.

The preferred form of construction as illustrated in the drawing, comprises an elongated substantially rectanuglar aeration chamber 1, mounted upon a suitable supporting framework 2. Extending along one side of the chamber 1 and substantially co-extensive therewith is a frothing chamber or box 3 which is open at its upper side and provided with an inclined bottom 4. Communicating with the head end of the aeration chamber 1 is an entrance opening or inlet 5 through which the pulp to be treated is introduced into said chamber. Leading from the bottom of the frothing chamber 3 at the opposite or tail end of the machine is a discharge pipe 6 through which tailings is discharged.

Formed in one side of the chamber 1 adjacent the upper edge thereof and extending longitudinally thereof is a plurality of aeration chamber discharge outlets 7 from which lead downwardly extending passages 8 which communicate at their lower ends with the chamber 3 as shown. In a wall of the passage 8 adjacent its lower end are openings 8′ for a purpose later described.

Figure 3:
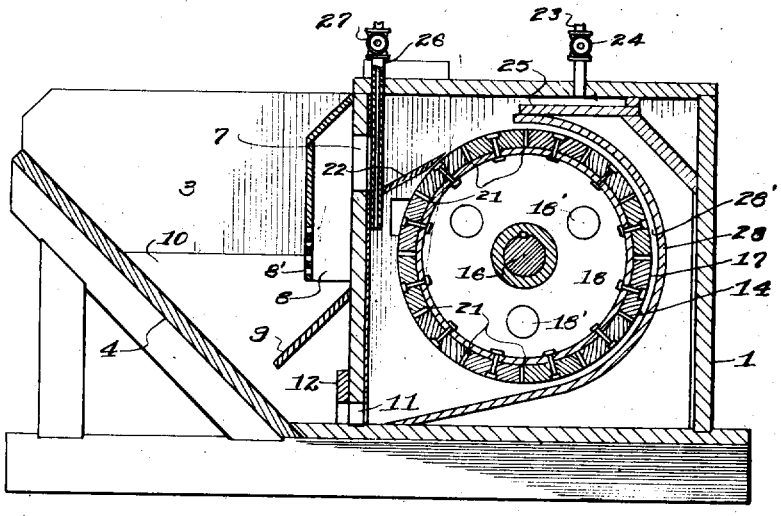
Fig. 3 is an enlarged vertical transverse section of the apparatus.

Arranged below the lower ends of passage 8 is a baffle board or flange 9 which serves to deflect the pulp discharged through said passage outwardly. Provided in the bottom of the frothing chamber 3 is a plurality of vertically extending partitions 10, the lower ends of the passage 8 terminating below the plane of the upper edges of said partitions as shown in Fig. 3. These partitions are arranged to obstruct the passage of pulp from the head end of the frothing chamber to the tail end.

Leading from the bottom of the frothing chamber 3 to the bottom of the aeration chamber 1 is a plurality of spaced return openings 11 which are controlled by a sliding gate valve 12 having a notched lower end to correspond with said openings 11. Said valve 12 is manually adjusted through the medium of a hand wheel 13 coöperating with one end thereof, and controls the return of pulp from the frothing chamber for retreatment.

Figure 7:
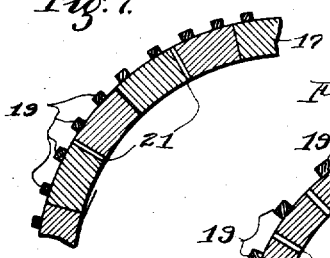
Figs. 4, 5, 6 and 7 are detail sectional fragments of the aeration drum showing various forms which may be employed.
Figure 4:
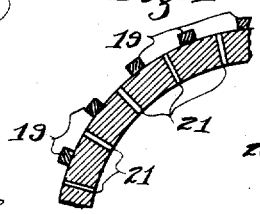
Figure 5:
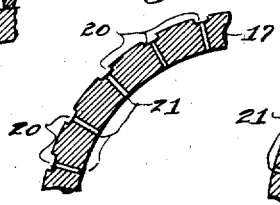
Figure 6:
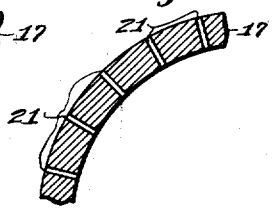

Arranged in the aeration chamber 1 is the aeration element or drum 14. Said drum consists of a cylindrical wall 17 which is bolted as shown to disks 18 fixed to a shaft 16 extending centrally through the aeration chamber and having its ends suitably mounted in bearings provided at the ends of said chamber. The disks have perforations 18′ to admit air, and if desired spiders may be substituted for the disks. The construction required is merely means to mount the drum upon the shaft and permit free entrance of air. The cylindrical wall 17 is provided with perforations 21 which extend therethrough and communicate with the interior of the drum. The periphery of the wall 17 is roughened by arranging thereon a plurality of closely spaced longitudinally extending riffles 19 as shown in Fig. 4 or correspondingly arranged recesses 20 as shown in Fig. 6, or by providing said wall with closely arranged perforations 21 as shown in Fig. 6, or both riffles and perforations as shown in Fig. 7. The roughening of the wall 17 causes greater adhesion of the pulp and more efficient action in moving the latter. The riffles or their equivalents assist in moving any sand which may be mingled with the pulp.

Provided in the chamber 1 at the lower edge of the outlet opening 7 is an inwardly projecting flange 22 which serves to direct toward said outlet opening the thin sheet of pulp centrifugally thrown from the aeration element. Communicating with the upper end of the aeration chamber is a plurality of air supply pipes 23, passage through which is controlled by valves 24. Arranged in chamber 1 below the lower ends of the air supply pipes 23 is a deflecting board 25 so arranged that the air which is supplied to the chamber 1 will be introduced into said chamber adjacent the periphery of the aeration element tangentially thereto and in a direction toward the outlet opening 7. The thin sheet of pulp thrown from the aeration drum draws air through pipes 23 increasing the aeration of the pulp.

Oil supply pipes 26 are employed communicating with the interior of the chamber which are controlled by valves 27.

Figure 8:
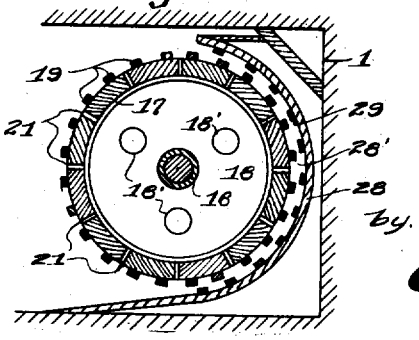
Fig. 8 is a detail section illustrating a modified form of casing for the drum.

A casing 28 is spaced from and about the rear portion of the drum 17 as indicated in Fig. 3, thereby providing an aeration space 28′ of arcuate section through which the pulp travels and in which it is aerated. Longitudinal riffles, in case agitation should be desired, are provided on the interior surface of casing 28, as indicated in Fig. 8. The casing 28 at its lower part is extended to the floor of the aeration chamber in a direction tangential to the aeration drum. This construction assists in the direction of pulp to the inlet of the aeration space.

In operation the aeration element of the drum 14 is rotated at a suitable speed. The pulp level inside the aeration chamber is maintained by means of the gate 12 at such a height that the outer surface of the aeration drum is slightly immersed in the pulp, the latter being slightly higher than the tangent to the lower surface of the drum. The level is maintained just sufficient to fill the entrance of the aeration space 28′. A greater height is not desirable as agitation and beating of the pulp will result. This is ineffective in producing aeration and results in a loss of power. Excessive beating of the pulp may also result in emulsification which is found to be undesirable.

In the rotation of the drum the adhesion of the pulp to the drum causes a flow of the plup at high velocity through the aeration space 28′. This produces a high velocity head and a low pressure head, the pressure head decreasing with the increase of velocity. By imparting sufficient velocity to the pulp, the pressure head may be decreased to less than atmospheric pressure, and air induced through the perforations 21. It will be noted that air may readily enter the interior of the drum through the hollow drip cups at each end of the chamber 1. Air is thereby introduced into the pulp and co-mingled therewith. Aerated plup is thrown off the surface of the drum at the upper end of casing 20, due to the centrifugal action and encounters the apron 22 being directed thereby into the outlet openings 7; air is also induced through the pipe 23 into the aerating chamber, mixing with the pulp as it is thrown from the drum.

As the pulp passes into the passage 8 it moves downwardly into the frothing chamber and some of it passes through the openings 8′ thereby avoiding eddies which would carry the froth and mineral downwardly to the bottom of the frothing chamber. If the pulp is passed directly downwardly without some such means as the perforations 8′ eddies or whirls would be set up about horizontal axes. These eddies are found to carry a large amount of mineral to the bottom of the frothing chamber with the pulp.

The froth overflows from the top of the frothing chamber carrying with it mineral, and the pulp sinks to the bottom. This pulp returns to the aeration chamber for retreatment. As the discharge pipe 6 for tailings is opened, a movement of the pulp occurs toward the tail end of the frothing chamber bringing some of the pulp to openings 11 nearer the tail end. This pulp then passes through the openings 11 into the aeration chamber and is again carried through the aeration space 28′ where it is aerated and discharged at a point farther from the head end. As there is a movement of the pulp longitudinally of the drum from the head end to the tail end of the machine, and also a movement of the pulp about the drum, the pulp in its successive retreatments is describing a substantially helical path from the head end of the machine toward the tail end, and when it reaches the tail end is completely demineralized.

In mechanically actuated flotation machines especially of the horizontal type, bearings are necessary for the shaft carrying the agitators. These bearings when below the level of the pulp must be packed to prevent the pulp from leaking therethrough. Due to the sand and other gritty material in the pulp the bearings and shaft rapidly wear and must be repaired and replaced. Our invention is not subject to such difficulties as the bearings for the aeration drum shaft are not in contact with the pulp.

What we claim is:

1. A flotation machine comprising, the combination of a single compartment aeration chamber having an inlet for pulp at the head end; rotary aerating means in said aeration chamber; a frothing chamber having a tailings discharge at the tail end; said frothing chamber and said aeration chamber provided with means of communication, whereby pulp circulates through said chambers in a helical path.

2. A flotation machine comprising, the combination of a single compartment aeration chamber having an inlet for pulp at the head end; a rotary aerating means therein coextensive with said aeration chamber; a frothing chamber; said frothing chamber and said aeration chamber provided with means of communication, whereby pulp circulates through said chambers in a helical path.

3. A flotation machine comprising, the combination of a single compartment aeration chamber having an inlet for pulp at the head end; rotary aerating means in said aeration chamber; a frothing chamber having a tailings discharge at the tail end; said frothing chamber and said aeration chamber provided with means of communication, whereby pulp circulates through said chambers in a helical path; and means to regulate the flow of pulp through said means of communication.

4. A flotation machine comprising, the combination of a single compartment aeration chamber having an inlet for pulp at the head end; rotary aerating means therein co-extensive with said aeration chamber; a frothing chamber having a tailings discharge at the tail end; said frothing chamber and said aeration chamber provided with means of communication, whereby pulp circulates through said chambers in a helical path; and means to regulate the flow of pulp through said means of communication.

5. A flotation machine comprising, the combination of a single compartment aeration chamber having an inlet for pulp at the head end; rotary aerating means in said aeration chamber; a frothing chamber having a tailings discharge at the tail end; said frothing chamber and said aeration chamber provided with means of communication, whereby pulp circulates through said chambers in a helical path; and means in said frothing chamber to obstruct the flow of pulp in said frothing chamber from the head end to the tail end thereof.

6. A flotation machine comprising, the combination of a single compartment aeration chamber having an inlet for pulp at the head end; a rotary aerating means therein co-extensive with said aeration chamber; a frothing chamber having a tailings discharge at the tail end; said frothing chamber and said aeration chamber provided with means of communication, whereby pulp circulates through said chambers in a helical path; and means in said frothing chamber to obstruct the flow of pulp from the head end to the tail end thereof.

7. A flotation machine comprising, the combination of a single compartment aeration chamber having an inlet for pulp at the head end; rotary aerating means in said aeration chamber; a frothing chamber having a tailings discharge at the tail end; said frothing chamber and said aeration chamber provided with means of communication, whereby pulp circulates through said chambers in a helical path; means to regulate the flow of pulp through said means of communication; and means in said frothing chamber to obstruct the flow of pulp in said frothing chamber from the head end to the tail end thereof.

8. A flotation machine comprising, the combination of a single compartment aeration chamber having an inlet for pulp at the head end; rotary aerating means therein co-extensive with said aeration chamber; a frothing chamber having a tailings discharge at the tail end; said frothing chamber and said aeration chamber provided with means of communication, whereby pulp circulates through said chambers in a helical path; means to regulate the flow of pulp through said means of communication; and means in said frothing chamber to obstruct the flow of pulp in said frothing chamber from the head end to the tail end thereof.

9. A flotation machine comprising, the combination of a single compartment aeration chamber having an inlet for pulp at the head end thereof; rotary aerating means in said aeration chamber; a frothing chamber having a tailings discharge at the tail end; said frothing chamber and said aeration chamber provided with means of communication, whereby pulp circulates through said chambers in a helical path; and a plurality of spaced transversely extending partitions provided in said frothing chamber at the bottom thereof to obstruct the flow of pulp from the head end to the tail end thereof.

10. A flotation machine comprising, the combination of a single compartment aeration chamber having an inlet for pulp at the head end thereof; rotary aerating means therein co-extensive with said aeration chamber; a frothing chamber having a tailings discharge at the tail end; said frothing chamber and said aeration chamber provided with means, whereby pulp circulates through said chambers in a helical path; and a plurality of spaced transversely extending partitions provided in said frothing chamber at the bottom thereof to obstruct the flow of pulp from the head end to the tail end thereof.

11. A flotation machine comprising, the combination of a single compartment aeration chamber having an inlet for pulp at the head end; rotary aerating means in said aeration chamber; a frothing chamber having a tailings discharge at the tail end; said frothing chamber and said aeration chamber provided with means of communication, whereby pulp circulates through said chambers in a helical path; means to regulate the flow of pulp through said means of communication; and a plurality of spaced transversely extending partitions provided in said frothing chamber at the bottom thereof to obstruct the flow of pulp from the head end to the tail end thereof.

12. A flotation machine comprising, the combination of a single compartment aeration chamber having an inlet for pulp at the head end; rotary aerating means therein co-extensive with said aeration chamber; a frothing chamber having a tailings discharge at the tail end thereof; said frothing chamber and said aeration chamber provided with means of communication, whereby pulp circulates through said chambers in a helical path; means to regulate the flow of pulp through the means of communication; and a plurality of spaced transversely extending partitions provided in said frothing chamber at the bottom thereof to obstruct the flow of pulp from the head end to the tail end.

13. In a flotation machine, the combination of a single compartment aeration chamber having an inlet for pulp at the head end thereof, a frothing chamber having an outlet for tailings at the tail end thereof, there being discharge means establishing communication between the upper part of said aeration chamber and said frothing chamber and pulp return means establishing communication between the lower part of said frothing chamber and said aeration chamber, a drum mounted in said aeration chamber, a casing spaced from the said drum and aeration means in said chamber.

14. In a flotation machine, the combination of a single compartment aeration chamber having an inlet for pulp at the head end thereof, a frothing chamber having an outlet for tailings at the tail end thereof, there being discharge means establishing communication between the upper end of said aeration chamber and said frothing chamber and pulp return means establishing communication between the lower part of said frothing chamber and said aeration chamber, an aeration drum mounted in said aeration chamber, a casing partially encircling and spaced from said drum forming therewith an aeration space open at its lower end adjacent said return means and open at its upper end adjacent said discharge means.

15. In a flotation machine, the combination of a single compartment aeration chamber having an inlet for pulp at the head end thereof, a frothing chamber having an outlet for tailings at the tail end thereof, there being discharge means establishing communication between the upper part of said aeration chamber and said frothing chamber and pulp return means establishing communication between the lower part of said frothing chamber and said aeration chamber, aeration means in said aeration chamber, and adjustable means regulating the area of said return means.

16. In a flotation machine, the combination of a single compartment aeration chamber having an inlet for pulp at the head end thereof, a frothing chamber having an outlet for tailings at the tail end thereof, there being discharge means establishing communication between the upper end of said aeration chamber and said frothing chamber and pulp return means establishing communication between the lower part of said frothing chamber and said aeration chamber, an aerating drum in said aeration chamber, a casing partially encircling and spaced from said drum forming therewith an aeration space open at its lower end adjacent said return means and open at its upper end adjacent said discharge means, and adjustable means regulating the area of said return means.

17. A flotation machine, comprising a single compartment aeration chamber, a rotary aeration element in said chamber; a frothing chamber, there being an outlet opening through which the pulp aerated in said aeration chamber is adapted to pass to said frothing chamber; and a casing closely surrounding a portion of said aeration element extending from the underside thereof to a point at which the pulp in leaving said element passes toward said opening to said frothing chamber.

18. A flotation machine, comprising an aeration chamber; a rotary element in said chamber; a frothing chamber, there being an outlet opening through which the pulp aerated in said aeration chamber is adapted to pass to said frothing chamber; a fluid supply communicating with said aeration chamber; means in said aeration chamber for directing the fluid supplied thereto in a direction substantially tangential of said aeration element and toward said outlet opening; and a casing closely surrounding a portion of said aeration element extending from the underside thereof to said last mentioned means.

19. A flotation machine, comprising an aeration chamber; a rotary element in said chamber; a frothing chamber, there being an outlet opening through which the pulp aerated in said aeration chamber is adapted to pass to said frothing chamber; a fluid supply communicating with said aeration chamber; means in said aeration chamber for introducing thereinto the fluid supplied thereto adjacent the periphery of said aeration element and in the direction of said outlet opening; and a casing closely surrounding a portion of said aeration element extending from the underside thereof to said last mentioned means substantially as described.

FREDERICK B. KOLLBERG.
MAX KRAUT.